US011064480B2

(12) United States Patent
Takeda et al.

(10) Patent No.: US 11,064,480 B2
(45) Date of Patent: Jul. 13, 2021

(54) USER TERMINAL, RADIO BASE STATION AND RADIO COMMUNICATION METHOD

(71) Applicant: NTT DOCOMO, INC., Tokyo (JP)

(72) Inventors: Kazuki Takeda, Tokyo (JP); Tooru Uchino, Tokyo (JP); Kazuaki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/547,126

(22) PCT Filed: Jan. 29, 2016

(86) PCT No.: PCT/JP2016/052616
§ 371 (c)(1),
(2) Date: Jul. 28, 2017

(87) PCT Pub. No.: WO2016/121913
PCT Pub. Date: Aug. 4, 2016

(65) Prior Publication Data
US 2018/0014291 A1    Jan. 11, 2018

(30) Foreign Application Priority Data
Jan. 29, 2015   (JP) .............................. JP2015-015432

(51) Int. Cl.
*H04W 72/04*    (2009.01)
*H04L 5/00*     (2006.01)
*H04J 11/00*    (2006.01)

(52) U.S. Cl.
CPC ........... *H04W 72/044* (2013.01); *H04J 11/00* (2013.01); *H04W 72/04* (2013.01); *H04W 72/042* (2013.01); *H04L 5/001* (2013.01)

(58) Field of Classification Search
CPC .. H04J 11/00; H04L 5/001; H04L 5/00; H04L 5/003; H04L 5/005; H04W 72/04;
(Continued)

(56) References Cited

U.S. PATENT DOCUMENTS 8,855,075 B2    10/2014   Nishio et al.
9,173,214 B2    10/2015   Li et al.
(Continued)

FOREIGN PATENT DOCUMENTS

| EP | 2512050 A1 | 10/2012 |
| JP | 2013-539303 A | 10/2013 |
| WO | 2011/099306 A1 | 8/2011 |

OTHER PUBLICATIONS

International Search Report issued in PCT/JP2016/052616 dated Apr. 5, 2016 (2 pages).
(Continued)

*Primary Examiner* — Phong La
(74) *Attorney, Agent, or Firm* — Osha Bergman Watanabe & Burton LLP

(57) ABSTRACT

The present invention is designed so that cross-carrier scheduling is carried out adequately even when the number of component carriers that can be configured in a user terminal is expanded compared to that of existing systems. A user terminal can communicate by using six or more component carriers, and has a receiving section that receives downlink control information including a carrier indicator field (CIF); and a control section that controls a receiving process of a downlink shared channel and/or a transmission process of an uplink shared channel in a predetermined component carrier based on the CIF, and the receiving section receives downlink control information including the same CIF value from different component carriers; and the control section determines the predetermined component carrier, considering an offset that is configured to a CIF value of each component carrier that transmits downlink control information including the CIF.

3 Claims, 12 Drawing Sheets

(58) Field of Classification Search
CPC .............. H04W 72/042; H04W 72/02; H04W 72/0493; H04W 72/0486; H04W 72/044
USPC ........................................................ 370/330
See application file for complete search history.

(56) References Cited

U.S. PATENT DOCUMENTS

| | | | | |
|---|---|---|---|---|
| 2012/0113941 A1* | 5/2012 | Chung | ................ | H04L 27/2602 370/329 |
| 2012/0243498 A1* | 9/2012 | Kwon | ....................... | H04L 5/00 370/329 |
| 2013/0010619 A1* | 1/2013 | Fong | ................. | H04W 72/0453 370/252 |
| 2013/0064190 A1* | 3/2013 | Hariharan | ............. | H04L 5/0053 370/329 |
| 2013/0070690 A1* | 3/2013 | Moon | ................... | H04L 5/0053 370/329 |
| 2013/0155969 A1* | 6/2013 | Moon | ................. | H04W 72/042 370/329 |
| 2014/0050130 A1* | 2/2014 | Kim | ........................ | H04L 5/001 370/280 |
| 2014/0119339 A1* | 5/2014 | Yang | ....................... | H04L 5/001 370/331 |
| 2014/0153452 A1* | 6/2014 | Son | ......................... | H04L 5/001 370/280 |
| 2015/0208392 A1* | 7/2015 | Park | ....................... | H04B 7/024 370/329 |
| 2016/0212786 A1* | 7/2016 | Hwang | ................ | H04W 52/281 |
| 2017/0195099 A1* | 7/2017 | Kahtava | ............ | H04W 72/0406 |
| 2017/0195999 A1* | 7/2017 | Feng | ...................... | H04W 76/27 |
| 2017/0374569 A1* | 12/2017 | Lee | ...................... | H04W 72/042 |

OTHER PUBLICATIONS

Written Opinion of the International Searching Authority issued in PCT/JP2016/052616 dated Apr. 5, 2016 (4 pages).
HTC; "Configuration of Carrier Indicator Field"; 3GPP TSG-RAN WG1 #60bis, R1-102285; Beijing, China; Apr. 12-16, 2010 (5 pages).
3GPP TS 36.300 V85.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; May 2008 (134 pages).
Extended European Search Report issued in the counterpart European Patent Application No. 16743516.3, dated Aug. 22, 2018 (8 pages).
Office Action issued in the counterpart European Office Action No. 16743516.3, dated May 13, 2019 (6 pages).
Office Action issued in Chinese Application No. 201680007734.X, dated Oct. 9, 2020 (14 pages).
Office Action issued in the counterpart European Office Action No. 16743516.3, dated Jun. 24, 2020 (10 pages).
Office Action issued in the counterpart European Patent Application No. 16743516.3, dated Feb. 10, 2021 (15 pages).

* cited by examiner

| ServeCellIndex OF SCHEDULING CELLS | CIF VALUE | ServeCellIndex OF SCHEDULED CELLS |
|---|---|---|
| 0 | 0 | 0 |
| 0 | 1 | 11 |
| ... | ... | ... |
| 0 | 7 | 2 |
| 2 | 0 | 6 |
| ... | ... | ... |
| 2 | 7 | 3 |

FIG. 7

USER TERMINAL, RADIO BASE STATION AND RADIO COMMUNICATION METHOD

TECHNICAL FIELD

The present invention relates to a user terminal, a radio base station and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower delays and so on (see non-patent literature 1). Successor system of LTE—referred to as "LTE-advanced" (also referred to as "LTE-A") —have been under study for the purpose of achieving further broadbandization and increased speed beyond LTE, and the specifications thereof have been drafted as LTE Rel. 10 to 12.

The system band in LTE Rel. 10 to 12 includes at least one component carrier (CC), where the LTE system band constitutes one unit. Such bundling of a plurality of CCs into a wide band is referred to as "carrier aggregation" (CA).

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

In CA in the above-mentioned successor systems of LTE (LTE Rel. 10 to 12), the maximum number of CCs that can be configured per user terminal (UE) is limited to five. In and after LTE Rel. 13, which is an even more advanced successor system of LTE, a study is in progress to reduce the limit on the number of CCs that can be configured per UE and configure six or more CCs, in order to make possible even more flexible and faster wireless communication.

However, when the number of CCs that can be configured in a user terminal is expanded to six or more (for example, 32), it becomes difficult to use the transmission methods of existing systems (Rel. 10 to 12) on an as-is basis. For example, existing systems support cross-carrier scheduling (CCS) which reports PDSCH allocation of another cell to a user terminal where a plurality of cells (CCs) are configured, using a PDCCH of a predetermined cell. In this case, a radio base station can designates a cell for detecting the PDSCH using three bits of CIF (Carrier Indicator Field).

Meanwhile, when a user terminal receives DL signals using six or more CCs, how to control cross-carrier scheduling becomes an issue.

The present invention has been made in view of the above, and it is therefore an object of the present invention to provide a user terminal, a radio base station and a radio communication method, whereby cross-carrier scheduling can be carried out adequately even when the number of component carriers that can be configured in a user terminal is expanded from that of existing systems.

Solution to Problem

According to one aspect of the present invention, a user terminal capable of performing communication using six or more component carriers, has a receiving section that receives downlink control information including a CIF (Carrier Indicator Field), and a control section that controls a downlink shared channel receiving process and/or an uplink shared channel transmission process for a predetermined component carrier based on the CIF, where the receiving section receives downlink control information including the same CIF value from different component carriers, and the control section determines the predetermined component carrier, considering an offset configured to the CIF value of each component carrier that transmits downlink control information including the CIF.

Advantageous Effects of Invention

According to the present invention, cross-carrier scheduling can be carried out adequately even when the number of component carriers that can be configured in a user terminal is expanded from that of existing systems.

BRIEF DESCRIPTION OF DRAWINGS

FIG. 7 is a diagram to show an example of a table employed for cross-carrier scheduling according to this embodiment;

DESCRIPTION OF EMBODIMENTS

Figure 1A:
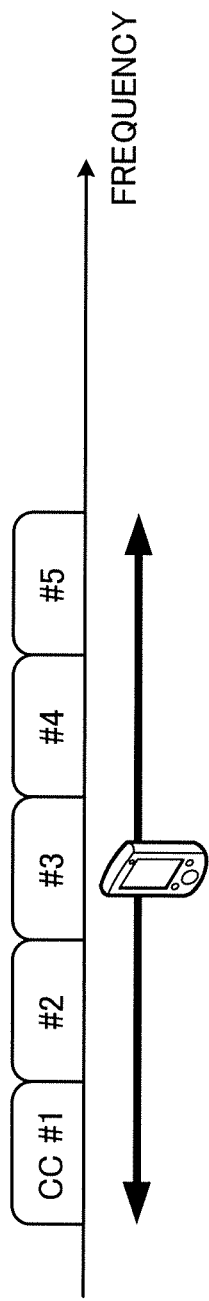
FIG. 1 provide diagrams to explain an overview of carrier aggregation in successor systems of LTE.

FIG. 1 provide diagrams to explain an overview of carrier aggregation in successor systems of LTE (LTE Rel. 10 to 12). FIG. 1A shows an overview of CA in LTE Rel. 10. FIG.

1B shows an overview of CA in LTE Rel. 11. FIG. 1C shows an overview of DC in LTE Rel. 12.

As shown in FIG. 1A, in CA in LTE Rel. 10, high speed data rates are made possible by providing a wide band by bundling maximum five component carrier (CCs) (CC #1 to CC #5), where the LTE system band constitutes one unit.

Figure 1B:
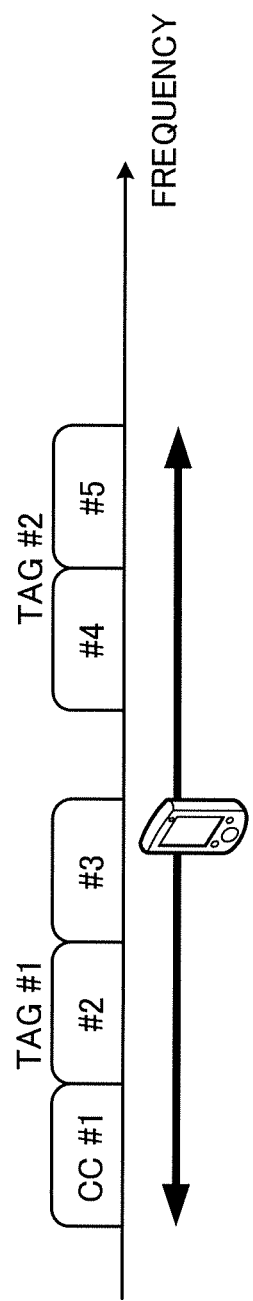
Figure 1C:
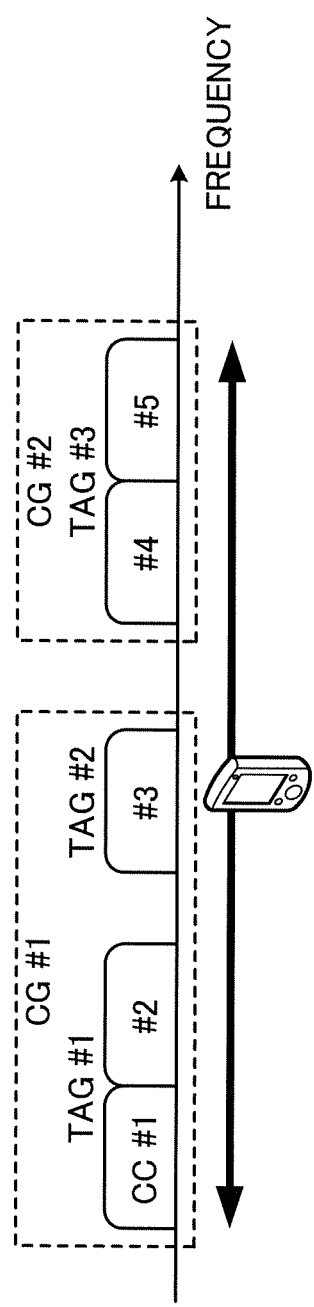

As shown in FIG. 1B, in CA in LTE Rel. 11, multiple timing advance (MTA), which enables varying timing control between CCs, is introduced. CA that employs MTA provides support for timing advance groups (TAGs), which are classified by the timing of transmission. Then, one radio base station's scheduler controls signal transmission timings on a per TAG basis. By this means, CA with a plurality of non-co-located CCs with small delay is realized, such as a radio base station and an RRH connected to the radio base station by ideal backhaul such as optical fiber.

In LTE Rel. 12, dual connectivity (DC), which bundles cell groups (CGs) formed by a plurality of radio base stations that are connected by non-ideal backhaul that produces delay that cannot be ignored, was introduced, and more flexible arrangement was realized (see FIG. 1C). In DC, it is assumed that scheduling is performed independently among the schedulers provided in a plurality of radio base stations. By this means, CA by CCs belonging to separate cell groups formed by radio base stations that carry out independent scheduling is made possible. Also, DC supports multiple timing advance even in cell groups configured.

In CA in these successor systems of LTE (LTE Rel. 10 to 12), the maximum number of CCs that can be configured per user terminal is limited to five. Meanwhile, in more advanced successor systems of LTE, such as LTE Rel. 13 and later versions, a study is in progress to soften the limit on the number of CCs that can be configured per user terminal, and use enhanced carrier aggregation (CA enhancement), in which six or more CCs (cells) are configured.

Figure 2:
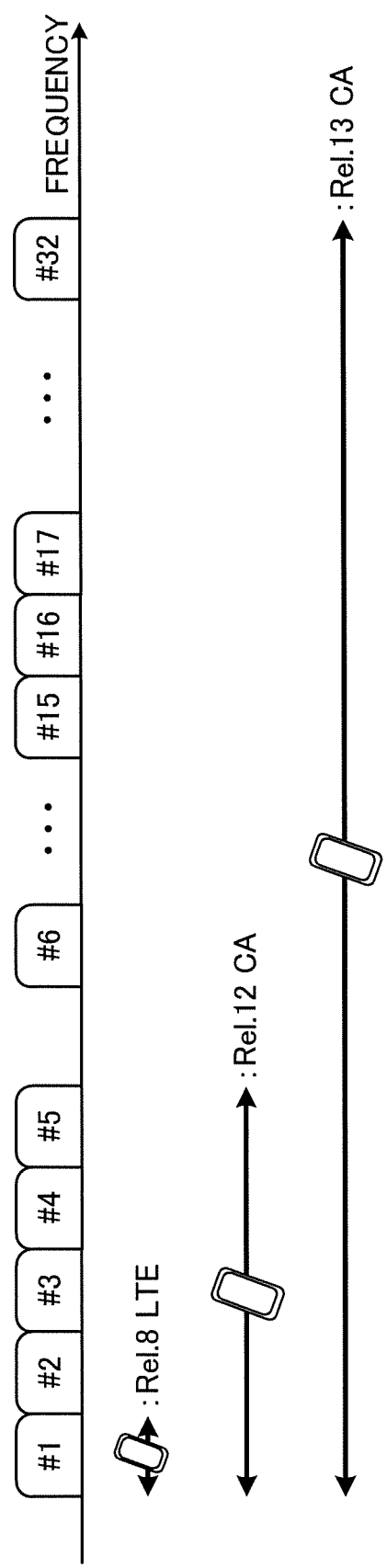
FIG. 2 is a diagram to explain component carriers in carrier aggregation being studied under LTE Rel. 13.

In enhanced CA, for example, as shown in FIG. 2, it is assumed that 32 component carriers are bundled together. In this case, it is possible to communicate using a bandwidth of maximum 640 MHz between the radio base station and the user terminal. By enhanced CA, more flexible and high speed wireless communication can be realized.

On the other hand, the present inventors have found that it is difficult to directly apply the transmission methods of existing systems (Rel. 10 to 12) when the number of CCs that can be configured in a user terminal is expanded to six or more (for example, 32).

For example, existing systems (Rel. 10 to 12) carrier aggregation (CA) support cross-carrier control in DL transmission and UL transmission. In DL cross-carrier scheduling, when employing CA, allocation of a downlink shared channel (PDSCH) and/or an uplink shared channel (PUSCH) of a given CC is commanded using a downlink control channel (PDCCH and/or EPDCCH) of another CC (see FIG. 3).

Figure 3:
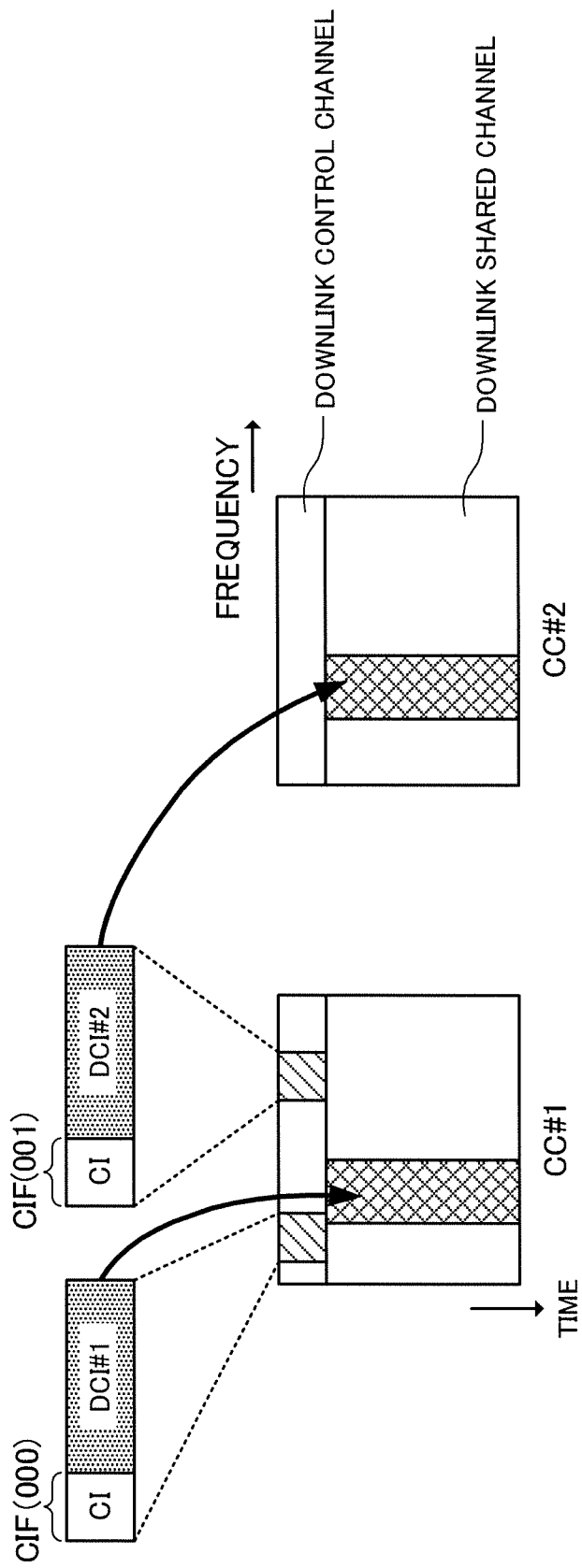
FIG. 3 is a diagram to show an example of cross-carrier scheduling in existing systems.

In FIG. 3, downlink control information (DCI #2) for commanding PDSCH and/or PUSCH allocation, which is transmitted in CC #2 (for example, S-Cell) is multiplexed to the PDCCH of another CC #1 (for example, P-Cell) and transmitted. At this time, in order to identify which CC's (CC1 or CC2) PDSCH and/or PUSCH allocation, downlink control information (DCI #2) multiplexed to the PDCCH of CC #1 indicates, DCI with a carrier indicator (CI) is configured. In existing systems, three bits of carrier indicator field (CIF) is configured to downlink control information, and a CC corresponding to the downlink control information is reported to a user terminal. The user terminal performs a PDSCH receiving process and/or a PUSCH transmission process in a predetermined CC based on the CIF included in the downlink control information.

Also, when employing cross-carrier scheduling for a given cell (CC), information about application of cross-carrier scheduling to the cell and information about which cell (CC) performs scheduling are reported to the user terminal. Such information about whether or not cross-carrier scheduling is employed and information about a scheduling cell (cell that transmits the CIF) can be reported from the radio base station to the user terminal as higher layer control information of the cell to be scheduled (for example, RRC control information).

Figure 4:
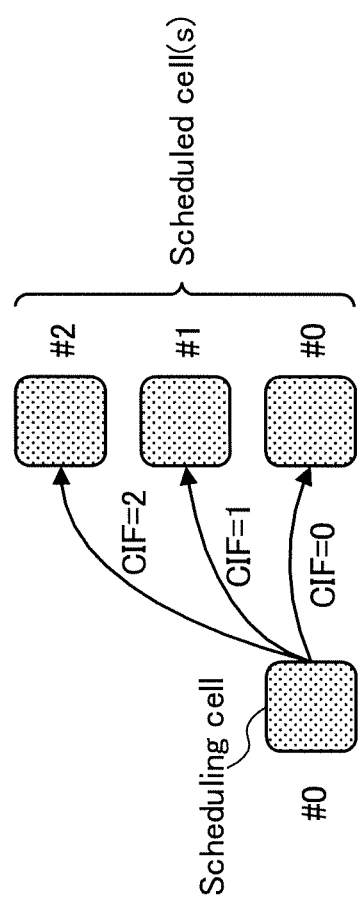
FIG. 4 is a diagram to describe a relationship between a scheduling cell and scheduled cell(s) in cross-carrier scheduling.

Here, a cell that controls PDSCH and/or PUSCH allocation of another cell (CC) (transmit DCI including CIF) may be referred to as a "scheduling cell." Also, a cell in which cross-carrier scheduling is configured (a cell to be scheduled based on the CIF) may be referred to as a "scheduled cell" (see FIG. 4).

Note that, the scheduling cell (CC) can also indicate PDSCH and/or PUSCH allocation of the scheduling cell to the user terminal using the CIF. For example, FIG. 4 shows a case where a scheduling cell is Cell #0 (CC #0), and scheduled cells are Cell #0 (corresponding to CIF=0), Cell #1 (corresponding to CIF=1), and Cell #2 (corresponding to CIF=2).

The user terminal identifies cells having an index (for example, a serve cell index) corresponding to three bits of CIF value included in the downlink control channel (PDCCH and/or EPDCCH) transmitted in the scheduling cell, and receives a PDSCH to be allocated in the cell. For example, CIF value=0 to 7 can be associated with Serve Cell Index #0 to #7.

At this time, when the user terminal decodes a downlink control channel in a common search space (CSS), the user terminal performs decoding assuming that there is no CIF. That is, when the CIF is configured, the user terminal decodes a control channel in which the CIF is configured in a UE specific search space (USS), and decodes a control channel in which the CIF is not configured in a common search space. The search space represents a range in which the user terminal performs monitoring (blind decoding) in a downlink control channel, and includes a UE specific search space (USS) that is independently configured for each UE and a common search space (CSS) that is commonly configured for each UE.

Also, the CA in existing systems (Rel. 10 to 12) configures five or less CCs as a premise. For this reason, a CIF is defined as three bits, and the CIF allows the radio base station to control maximum 8CCs (Serve Cell Index=0 to 7) of PDSCH allocation (scheduling) using a downlink control channel of a specific CC. Since the maximum number of CCs actually configured is five, the CIF value is 0 to 4.

Meanwhile, in enhanced CA which configures six or more CCs (for example, 32 CCs) for a user terminal (see FIG. 2), it is assumed that a plurality of CCs are scheduled at one time in order to improve the DL peak rate. In such a case, when employing existing cross-carrier scheduling which supports only up to 8CCs, communication may not carried out adequately.

Accordingly, the present inventors have come up with the idea of configuring a predetermined offset to the CIF transmitted from different CCs and determining, in the user terminal, the predetermined CC considering the offset, in the enhanced CA configuring six or more CCs to the user terminal. Alternatively, the present inventors have come up with the idea of controlling cross-carrier scheduling based on information that defines the CC corresponding to CIF value of each cell (CC) that transmits downlink control information including the CIF. By this means, even when receiving downlink control information including the same CIF value from different CCs, the user terminal can adequately determine the CC corresponding to the CIF value.

Also, the present inventors have conceived to carry out cross-carrier scheduling with increased number of CIF bits.

Now, the present embodiment will be described below in detail. Note that, although, in the following description, enhanced CA configuring 32 CCs will be described as an example, the present embodiment is by no means limited to this.

FIRST EXAMPLE

In a first embodiment, a case of determining a CC indicated by a CIF, considering an index (for example, a serveCellIindex) of a cell in which cross-carrier scheduling is employed (scheduled cell) and a value obtained by adding a predetermined offset to a CIF value will be described. Note that, although, in the following description, a case where 32 CCs configured in a user terminal are assigned indices #0 to #31 will be described, the present embodiment is by no means limited to this.

For example, when carrying out cross-carrier scheduling using 32 CCs, assume a case where a plurality of scheduling cells (CC) designate scheduled CCs by three bits of CIF. In such a case, a user terminal may receive downlink control information including the same CIF value from different scheduling cells. For this reason, when detecting the CIF, the user terminal interprets, as an index of the scheduled cell, a value obtained by adding predetermined multiple of offset (for example, 8) to the CIF value according to the index of the scheduled cell and then identifies a predetermined cell (CC) to receive a PDSCH (see FIG. 5).

In this case, an offset is configured that differs for each CIF in the scheduling cell to transmit downlink control information including the CIF. The offset may be configured to be n times (n is a natural number including 0) the number of cells (CC) indicated by the CIF. Note that, the user terminal can determine the offset configured for each CIF based on the index of the scheduling cell and/or the index of the scheduled cell.

Figure 5:
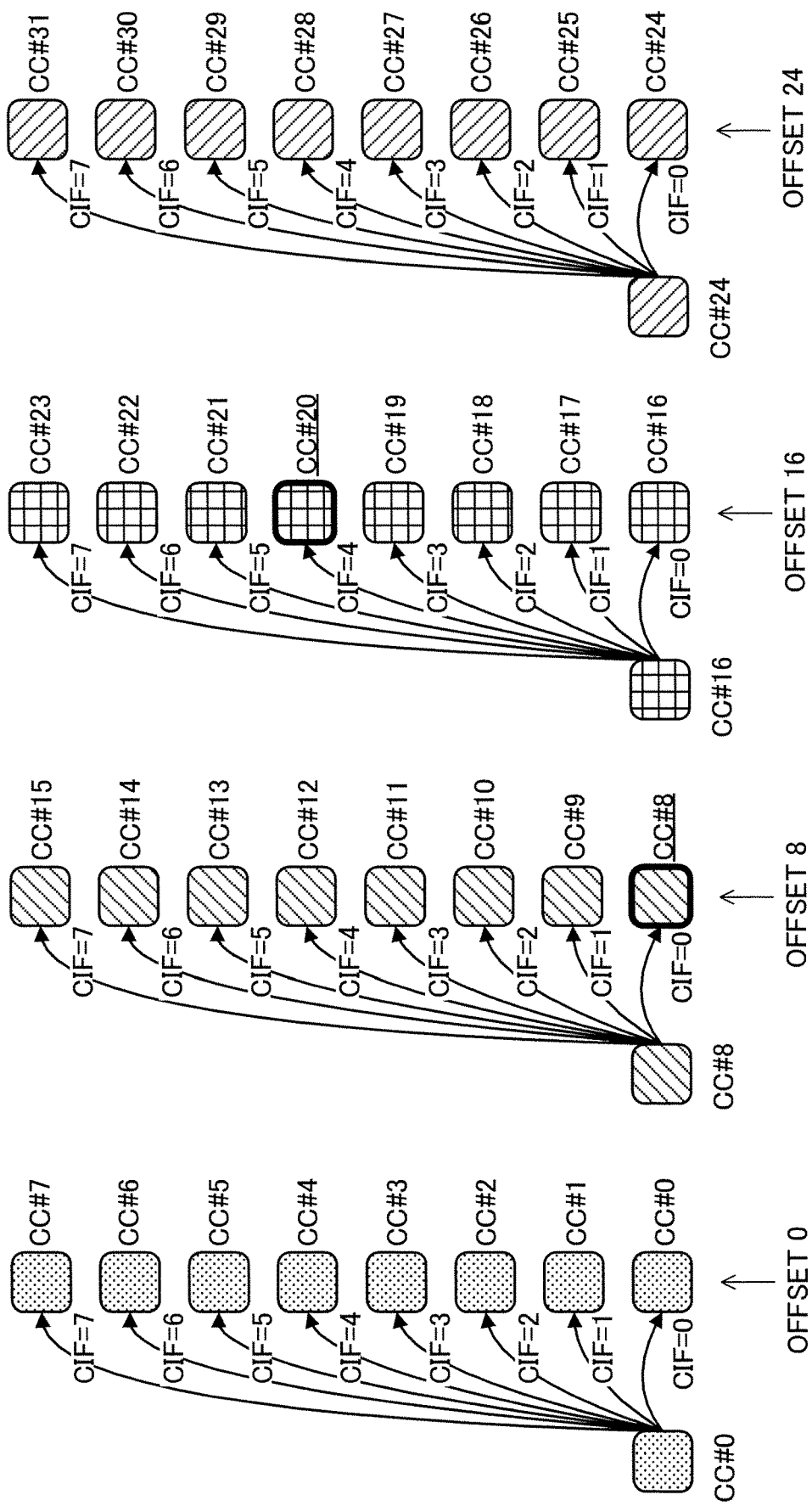
FIG. 5 is a diagram to show an example of cross-carrier scheduling according to this embodiment.

As shown in FIG. 5, a configuration in which a scheduling cell that transmits downlink control information including the CIF controls scheduling of CCs (cells) with consecutive indices may be possible. To be more specific, FIG. 5 shows a case where offset 0 is configured to CC #0 (cell #0) to CC #7 (cell #7), offset 8 is configured to CC #8 to CC #15, offset 16 is configured to CC #16 to CC #23, and offset 24 is configured to CC #24 to CC #31. FIG. 5 shows a case where CC #0, CC #8, CC #16, and CC #24 serve as a scheduling cell that transmits the CIF. Obviously, the present embodiment is by no means limited to this.

In FIG. 5, a case of applying cross-carrier scheduling to the cell of index #8 (CC #8) is assumed. When the CIF value of the PDCCH transmitted from the cell that schedules index #8 (here, CC #8) is 0, the user terminal considers the value obtained by adding a predetermined offset to the CIF value 0. Here, the user terminal determines that the PDSCH is allocated to the cell of index #8 based on a value obtained by adding a predetermined offset value 8 to the CIF value 0 (here, 8). Similarly, for example, in the case of applying cross-carrier scheduling to the cell of index #12 (CC #12), the user terminal can determine a cell to which the PDSCH is allocated based on a value obtained by adding a predetermined offset value 8 to the corresponding CIF value.

Also, in FIG. 5, a case of applying cross-carrier scheduling to the cell of index #20 (CC #20) is assumed. When the CIF value of PDCCH transmitted from the cell that schedules index #20 (here, #16) is 4, the user terminal considers a value obtained by adding a predetermined offset to the CIF value 4. Here, the user terminal determines that the PDSCH is allocated to the cell of index #20 based on a value obtained by adding a predetermined offset value 16 to the CIF value 4 (here, 20).

In the case of FIG. 5, one scheduling cell (CC) can control scheduling (cross-carrier scheduling) of eight cells. Accordingly, when four cells (4CCs) are configured as the scheduling cell, cross-carrier scheduling can be applied to maximum 32 CCs. Also, since the user terminal determines a CC to which the PDSCH is allocated based on the value obtained by a predetermined offset to the CIF value, the CIF configured in the downlink control information can be set to three bits similar to existing systems. Such a configuration suppresses an increase in overhead of downlink control information and enables the use of downlink control information (PDCCH) of existing systems.

Figure 6:
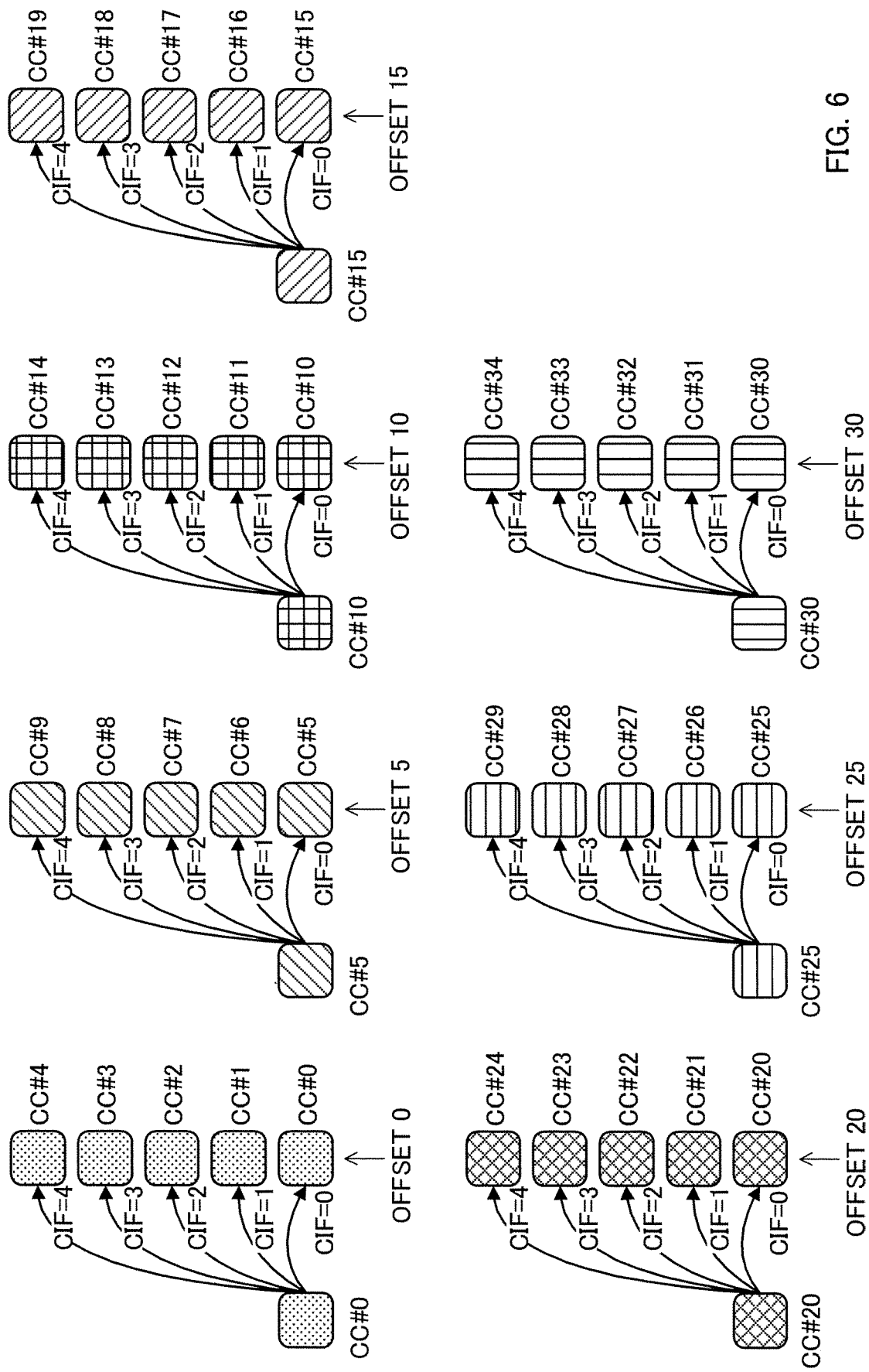
FIG. 6 is a diagram to show another example of cross-carrier scheduling according to this embodiment.

Note that, FIG. 5 shows a case where each scheduling cell controls scheduling of eight cells (CCs), but this is by no means limiting. For example, each scheduling cell may control scheduling of five cells (CCs) (see FIG. 6). In such a case, the user terminal and the radio base station can determine a CC to which the PDSCH is allocated based on a value obtained by adding a predetermined offset which is a multiple of five to the CIF value transmitted from each scheduling cell. Note that the combinations of FIG. 6 are simply examples, and are by no means limiting.

<Control Method>

Hereinafter, an example where the user terminal determines a predetermined CC considering an offset configured to the CIF value of each CC that transmits downlink control information including the CIF will be described.

The radio base station (network) configures a predetermined cell (for example, cell index #X) to the user terminal. Also, the radio base station reports the application of cross-carrier scheduling and information about a scheduling cell (cell that transmits the CIF) (for example, cell index #Y) for the configured predetermined cell #X to the user terminal. These pieces of information can be reported from a radio base station to the user terminal through higher layer signaling (for example, RRC signaling and so on).

The user terminal detects the downlink control channel transmitted from the scheduling cell #Y and acquires the CIF value. When the CIF value is Z, the user terminal determines that the downlink control channel is scheduling for predetermined cell # (Z+Floor (Y/8)×8) and performs receiving processes of the PDSCH (decoding and so on) in the predetermined cell # (Z+Floor (Y/8)×8).

By this means, the user terminal determines a cell to which a PDSCH and/or a PUSCH are allocated using the value indicated by the CIF and the index of scheduling cell, for the index of a predetermined CC in which cross-carrier scheduling is configured. Now, in FIG. 5, a case where cell #X is CC #20 will be described in detail.

The radio base station configures CC #20 and reports, to the user terminal, the application of cross-carrier scheduling to CC #20 and information that CC #16 schedules CC #20. The user terminal detects downlink control information (PDCCH and/or EPDCCH) transmitted from scheduling CC #16 and acquires the CIF value. When the CIF value transmitted from scheduling CC #16 is 4, the user terminal can determine that downlink control information transmitted from CC #16 is scheduling for CC #20 (=4+Floor (20/8)×8).

SECOND EXAMPLE

In a second embodiment, a case will be described where, when cross-carrier scheduling is carried out, the index for cell that carries out scheduling and the predetermined cell corresponding to the CIF transmitted from the scheduling cell are configured in advance.

FIG. 7 shows an example of a table to show the relationship between the scheduling cell index for controlling scheduling and the scheduled cell index corresponding to each CIF value used in the scheduling cell.

In FIG. 7, CIF=0 of scheduling cell #0 corresponds to cell #0, CIF=1 corresponds to cell #11, and CIF=7 corresponds to cell #2. Also, CIF=0 of another scheduling cell #2 corresponds to cell #6, and CIF=7 corresponds to cell #3.

The radio base station transmits information about the scheduling cell and information about the cell index of the CIF value corresponding to the scheduling cell (contents listed in the table in FIG. 7) to the user terminal through higher layer signaling (for example, RRC signaling) and so on.

The user terminal can identify a cell (CC) corresponding to each CIF value based on information transmitted from the radio base station (for example, the contents listed in the table in FIG. 7). For example, the user terminal can determine that cell #3 (CC #3) to which cross-carrier scheduling is applied is allocated when the CIF included in downlink control information of cell #2 is 7 based on the table in FIG. 7.

By this means, even when employing the same CIF value between scheduling cells, the user terminal can adequately identify a CC to which a PDSCH is allocated. Also, by configuring a cell corresponding to the CIF value of each scheduling cell in advance, it is possible to configure three bits of CIF to downlink control information similarly to existing systems. Such a configuration makes it possible to prevent the increase in the overhead of downlink control information and to utilize downlink control information (PDCCH) of the existing systems.

Also, in the second embodiment, it is possible to share the scheduling cell between cells in which the cell index is not consecutive, so that a configuration of flexibly combining the scheduling cells and the scheduled cell is possible.

Note that, although FIG. 7 shows a CIF value consisting of 8 values (CIF=0 to 7), the present embodiment is by no means limited to this. Also, the CIF value may consist of 5 values (CIF=0 to 4).

THIRD EXAMPLE

In a third embodiment, a case of carrying out cross-carrier scheduling with increased number of CIF bits will be described.

For example, it is possible to perform cross-carrier scheduling control by extending the CIF to five bits. The CIF of five bits makes it possible to designate 32 CCs. When the CIF of downlink control information (DCI) is extended to five bit, a new DCI format may be configured, or two bits for another field may be utilized in an existing DCI format. Note that, the extension bit of CIF is not limited to five bits.

Also, when employing a CIF in which the number of bits is extended from three bits, the user terminal may be configured not to detect the control channel (PDCCH and/or EPDCCH) to which the CIF of existing three bits is allocated.

For example, the user terminal does not perform blind decoding on three bits of CIF of PDCCH, and can perform blind decoding on the PDCCH to which an extended CIF (for example, five bits) is allocated. In this case, the user terminal can perform blind decoding on the PDCCH to which the extended CIF is allocated in the UE specific search space (USS), and perform blind decoding on the PDCCH in which the CIF is not configured in the common search space (CSS).

When the user terminal does not perform blind decoding on the PDCCH including three bits of existing CIF, the user terminal can reduce the number of times that the user terminal tries blind decoding. By this means, the processing load on the user terminal can be reduced.

Alternatively, when configuring the CIF in which the number of bits is extended from three bits, the user terminal may be configured to detect a control channel to which three bits of existing CIF is allocated and a PDCCH to which an extended CIF is allocated. In this case, the user terminal supports both the three bits of CIF and the extended CIF.

For example, the user terminal can perform blind decoding on a PDCCH to which the extended CIF is allocated in addition to a PDCCH to which three bits of CIF is allocated. In this case, the user terminal can perform blind decoding on, in the UE specific search space (USS), a PDCCH to which the extended CIF is allocated and a PDCCH to which three bits of CIF is allocated, and, in the common search space (CSS), a PDCCH in which no CIF is configured.

In this way, by performing blind decoding on the PDCCH including three bits of existing CIF and the PDCCH including the extended CIF, it is possible to employ (fallback) existing cross-carrier scheduling based on the number of CCs configured, and so on. For example, when, among a plurality of CCs, the number of CCs to which DL signals are transmitted (or the number of CCs in an active state) is five or less, the user terminal can employ existing cross-carrier scheduling (Rel. 12 CA w/cross-carrier scheduling). By this means, it is possible to dynamically change the bit length of downlink control information according to the amount of data to be allocated (the number of CCs to be allocated), and thereby the overhead in the downlink control channel can be reduced.

<Variation>

The user terminal may be configured to perform blind decoding on the PDCCH including the CIF in which the number of bits is extended, for limited predetermined subframes. In this case, the radio base station can configure information about predetermined subframes in the user terminal using higher layer signaling (for example, RRC signaling and so on).

Also, the user terminal may be configured to perform blind decoding on the PDCCH including the CIF in which the number of bits is expanded, with restriction to a predetermined downlink control channel (PDCCH and/or EPDCCH).

The predetermined downlink control channel may be one of the followings or a combination of these:

UE specific search space (USS);
EPDCCH;
One of the two sets of EPDCCH that are configured as an EPDCCH; and
Specific aggregation level among the total numbers of blind decoding (for example, aggregation level=1, 2, 4, and 8).

Each EPDCCH set is formed with a plurality of PRBs and information about the EPDCCH set can be reported from the radio base station to the user terminal.

In this way, by employing the CIF which is extended for some subframes and/or downlink control channels, it is possible to limit the increase in the processing load on the user terminal to some subframes or control channels as well as reduce the increase in the overhead of the other subframes and control channels.

(Structure of Radio Communication System)

Now, the structure of the radio communication system according to an embodiment of the present invention will be described below. In this radio communication system, the radio communication methods according to the embodiment of the present invention are employed. Note that the radio communication methods of the above-described embodiment may be applied individually or may be applied in combination.

Figure 8:
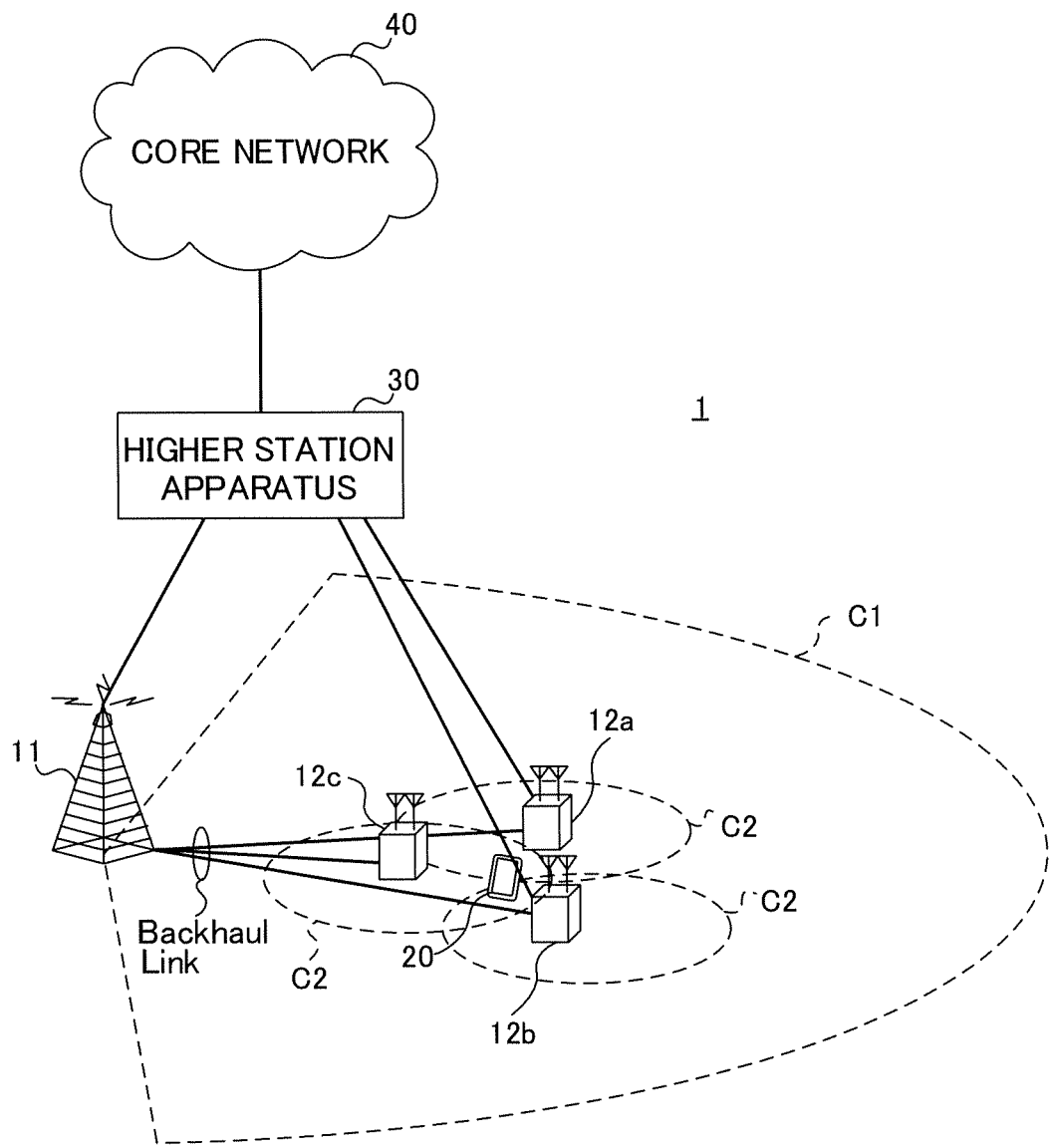
FIG. 8 is a diagram to show an example of a schematic structure of a radio communication system according to the present embodiment.

FIG. 8 is a diagram to show an example of a schematic structure of a radio communication system according to an embodiment of the present invention. Note that the radio communication system shown in FIG. 8 is a system to incorporate, for example, an LTE system, super 3G, an LTE-A system and so on. This radio communication system can adopt carrier aggregation (CA) to group a plurality of fundamental frequency blocks (component carriers) into one, where the LTE system bandwidth constitutes one unit, and/or adopt dual connectivity (DC). Note that this radio communication system may be referred to as "IMT-Advanced," or may be referred to as "4G," "5G," "FRA" (Future Radio Access) and so on.

The radio communication system 1 shown in FIG. 8 includes a radio base station 11 that forms a macro cell C1, and radio base stations 12a to 12c that form small cells C2, which are placed within the macro cell C1 and which are narrower than the macro cell C1. Also, user terminals 20 are placed in the macro cell C1 and in each small cell C2.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using at least six or more CCs (cells).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Between the radio base station 11 and the radio base stations 12 (or between two radio base stations 12), wire connection (optical fiber, the X2 interface, etc.) or wireless connection may be established.

The radio base station 11 and the radio base stations 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 12 may be connected with higher station apparatus 30 via the radio base station 11.

Note that the radio base station 11 is a radio base station having a relatively wide coverage, and may be referred to as a "macro base station," a "central node," an "eNB" (eNodeB), a "transmitting/receiving point" and so on. Also, the radio base stations 12 are radio base stations having local coverages, and may be referred to as "small base stations," "micro base stations," "pico base stations," "femto base stations," "HeNBs" (Home eNodeBs), "RRHs" (Remote Radio Heads), "transmitting/receiving points" and so on. Hereinafter the radio base stations 11 and 12 will be collectively referred to as "radio base stations 10," unless specified otherwise. The user terminals 20 are terminals to support various communication schemes such as LTE, LTE-A and so on, and may be either mobile communication terminals or stationary communication terminals.

In the radio communication system, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combination of these.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and predetermined SIBs (System Information Blocks) are communicated in the PDSCH. Also, the MIB (Master Information Block) and so on are communicated by the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI) including PDSCH and PUSCH scheduling information is communicated by the PDCCH. The number of OFDM symbols to use for the PDCCH is communicated by the PCFICH. HARQ delivery acknowledgement signals (ACKs/NACKs) in response to the PUSCH are communicated by the PHICH. The EPDCCH may be frequency-division-multiplexed with the PDSCH (downlink shared data channel) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data and higher layer control information are communicated by the PUSCH. Also, downlink radio quality information (CQI: Channel Quality Indicator), delivery acknowledgment signals (HARQ-ACKs) and so on are communicated by the PUCCH. By means of the PRACH, random access preambles (RA preambles) for establishing connections with cells are communicated.

<Radio Base Station>

Figure 9:
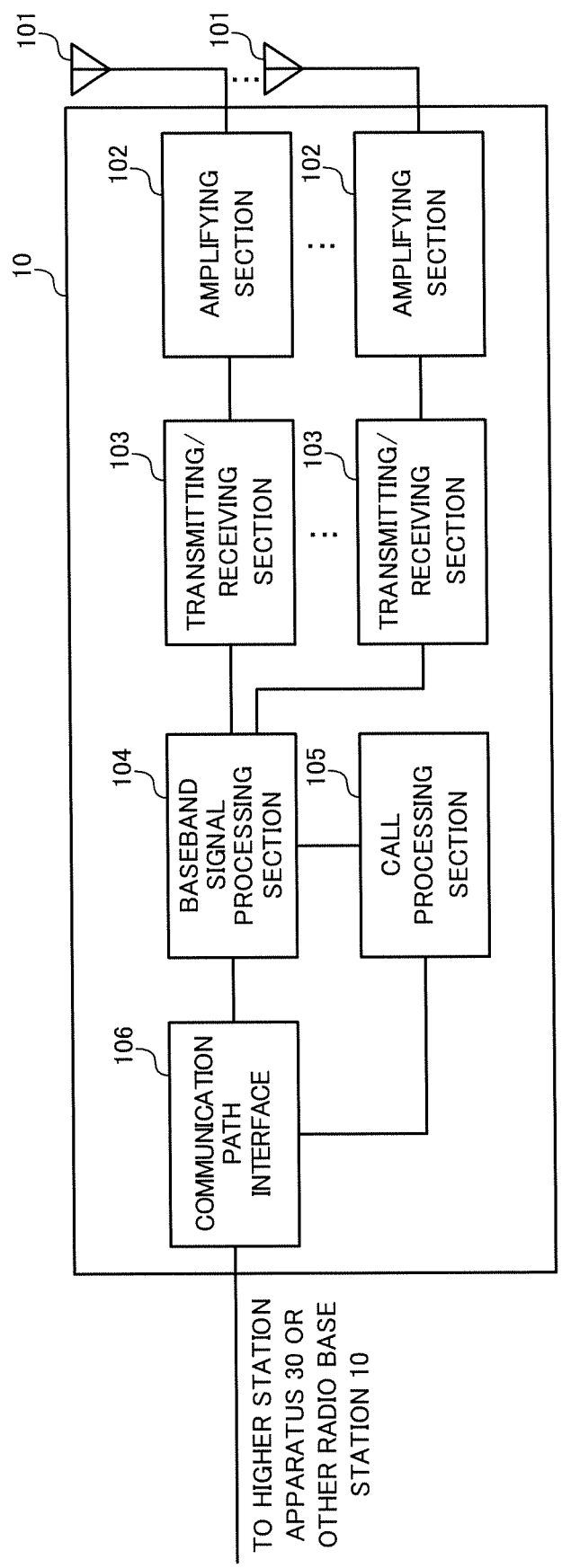
FIG. 9 is a diagram to show an example of an overall structure of a radio base station according to the present embodiment.

FIG. 9 is a diagram to show an example of an overall structure of a radio base station according to an embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that the transmitting/receiving sections 103 are comprised of transmitting sections and receiving sections.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Each transmitting/receiving section 103 converts baseband signals that are pre-coded and output from the baseband signal processing section 104 on a per antenna basis, into a radio frequency band. The radio frequency signals having been subjected to frequency conversion in the transmitting/receiving sections 103 are amplified in the amplifying sections 102, and transmitted from the transmitting/receiving antennas 101.

For example, the transmitting/receiving sections 103 can transmit information about a cell (CC) to which cross-carrier scheduling is applied, and information about a cell (CC) that schedules the cell (CC). Also, the transmitting/receiving sections 103 can transmit information about a CC corresponding to the CIF of each CC (scheduling cell) that transmits downlink control information including the CIF. For example, the transmitting/receiving sections 103 can transmit information of the table shown in FIG. 7. Note that, for the transmitting/receiving sections 103, transmitters/receivers, transmitting/receiving circuits or transmitting/receiving devices that can be described based on common understanding of the technical field to which the present invention pertains can be used.

Meanwhile, as for uplink signals, radio frequency signals that are received in the transmitting/receiving antennas 101 are each amplified in the amplifying sections 102. Each transmitting/receiving section 103 receives uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. The communication path interface 106 transmits and receive s signals to and from neighboring radio base stations 10 (backhaul signaling) via an inter-base station interface (for example, optical fiber, the X2 interface, etc.).

Figure 10:
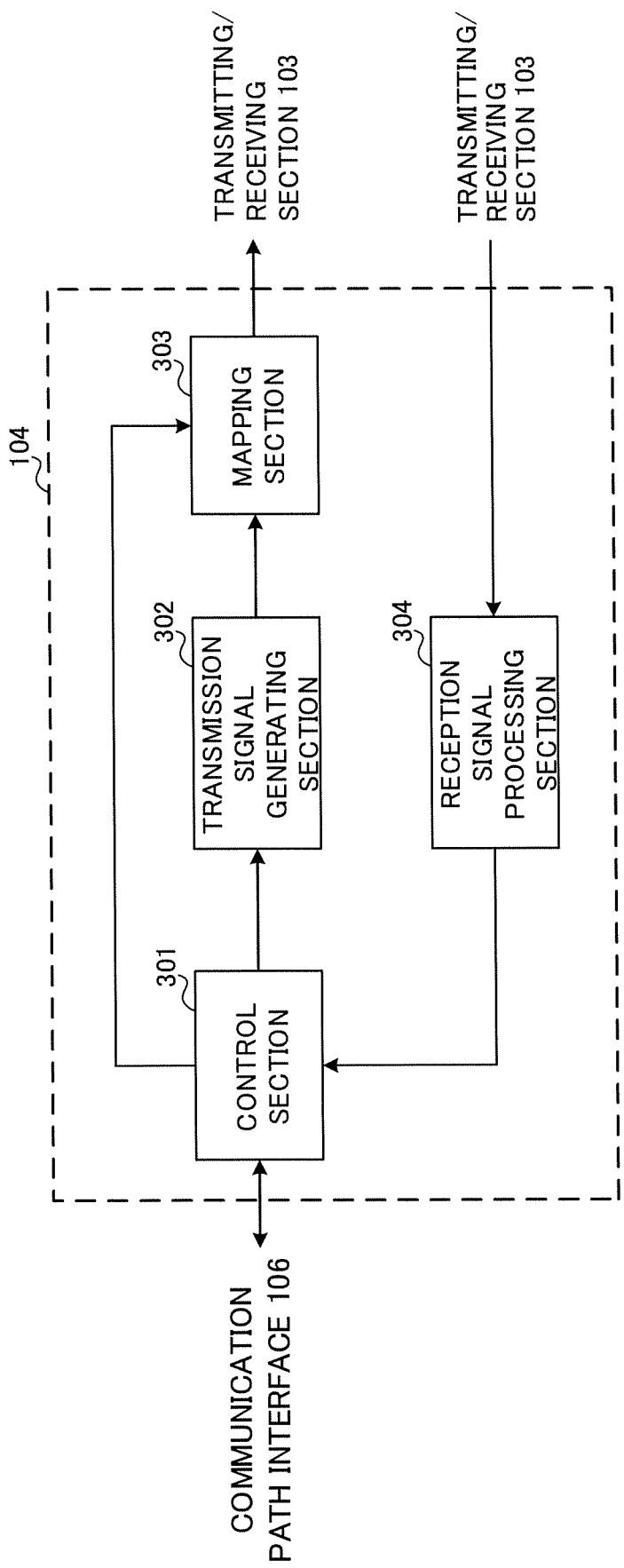
FIG. 10 is a diagram to show an example of a functional structure of a radio base station according to the present embodiment.

FIG. 10 is a diagram to show an example of a functional structure of a radio base station according to the present embodiment. Note that, although FIG. 10 primarily shows functional blocks that pertain to characteristic parts of the present embodiment, the radio base station 10 has other functional blocks that are necessary for radio communication as well. As shown in FIG. 10, the baseband signal processing section 104 has a control section (scheduler) 301, a transmission signal generating section (generating section) 302, a mapping section 303 and a received signal processing section 304.

The control section (scheduler) 301 controls the scheduling (for example, resource allocation) of downlink data signals that are transmitted in the PDSCH and downlink control signals that are communicated in the PDCCH and/or the EPDCCH. When employing cross-carrier scheduling, the control section 301 of the scheduling cell controls the allocation of the PDSCH of other cells (CCs). Also, when configuring indices for a plurality of scheduling cells and cells corresponding to the CIF that the scheduling cells transmit in advance (see FIG. 7), the control section 301 can select cells to be scheduled based on the configured information (contents in the table).

Also, the control section 301 controls the scheduling of system information, synchronization signals, paging information, CRSs (Cell-specific Reference Signals), CSI-RSs (Channel State Information Reference Signals) and so on. Also, the control section 301 controls the scheduling of uplink reference signals, uplink data signals that are transmitted in the PUSCH, uplink control signals that are transmitted in the PUCCH and/or the PUSCH, random access preambles that are transmitted in the PRACH, and so on.

For the control section 301, a controller, a control circuit or a control device that can be described based on common understanding of the technical field to which the present invention pertains can be used.

The transmission signal generating section 302 generates DL signals based on commands from the control section 301 and outputs these signals to the mapping section 303. For example, the transmission signal generating section 302 generates DL assignments, which report downlink signal allocation information, and UL grants, which report uplink signal allocation information, based on commands from the control section 301. Also, the downlink data signals are subjected to a coding process and a modulation process, based on coding rates and modulation schemes that are selected based on channel state information (CSI) from each user terminal 20 and so on.

Also, when employing cross-carrier scheduling, the transmission signal generating section 302 of the scheduling cell generates downlink control signals (DCI) including CIFs. The CIF may be formed with three bits (first embodiment, second embodiment), or extended (for example, five bits). Also, in a case of configuring indices of a plurality of scheduling cells, and cells corresponding to the CIF transmitted from the scheduling cells in advance (see FIG. 7), the transmission signal generating section 302 configures the CIF value based on the configured information (contents in the table).

For the transmission signal generating section 302, a signal generator, a signal generating circuit or a signal generating device that can be described based on common understanding of the technical field to which the present invention pertains can be used.

The mapping section 303 maps the downlink signals generated in the transmission signal generating section 302 to predetermined radio resources based on commands from the control section 301, and outputs these to the transmitting/receiving sections 103. Note that, for the mapping section 303, mapper, a mapping circuit or a mapping device that can be described based on common understanding of the technical field to which the present invention pertains can be used.

The received signal processing section 304 performs the receiving processes (for example, demapping, demodulation, decoding and so on) of the UL signals that are transmitted from the user terminals (for example, delivery acknowledgement signals (HARQ-ACKs), data signals that are transmitted in the PUSCH, random access preambles that are transmitted in the PRACH, and so on). The processing results are output to the control section 301.

Also, by using the received signals, the received signal processing section 304 may measure the received power (for example, the RSRP (Reference Signal Received Power)), the received quality (for example, the RSRQ (Reference Signal Received Quality)), channel states and so on. The measurement results may be output to the control section 301.

The receiving process section 304 can be constituted by a signal processor, a signal processing circuit or a signal processing device, and a measurer, a measurement circuit or a measurement device that can be described based on common understanding of the technical field to which the present invention pertains.

<User Terminal>

Figure 11:
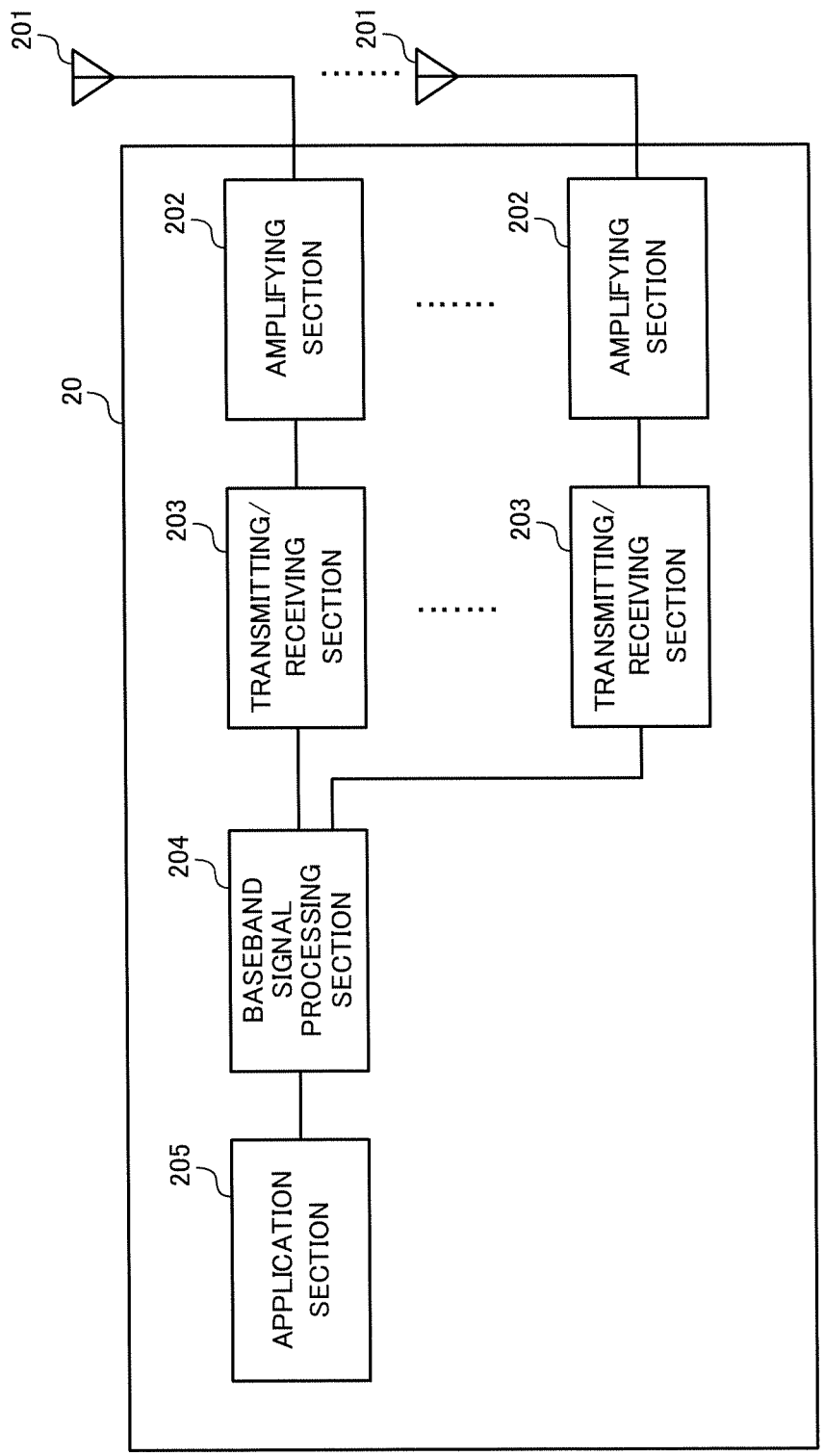
FIG. 11 is a diagram to show an example of an overall structure of a user terminal according to the present embodiment.

FIG. 11 is a diagram to show an example of an overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205. Note that the transmitting/receiving sections 203 may be comprised of transmitting sections and receiving sections.

Radio frequency signals that are received in a plurality of transmitting/receiving antennas 201 are each amplified in the amplifying sections 202. Each transmitting/receiving section 203 receives the downlink signals amplified in the amplifying sections 202. The received signal is subjected to frequency conversion and converted into the baseband signal in the transmitting/receiving sections 203, and output to the baseband signal processing section 204.

When cross-carrier scheduling is applied to a plurality of CCs, the transmitting/receiving sections 203 can receive downlink control information including the same CIF value from different CCs (scheduling cells). Also, the transmitting/receiving sections 203 can receive information about a CC to which cross-carrier scheduling is applied, and information about a scheduling CC that schedules the CC. Note that, for the transmitting/receiving sections 203, transmitters/receivers, transmitting/receiving circuits or transmitting/receiving devices that can be described based on common understanding of the technical field to which the present invention pertains can be used.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to each transmitting/receiving section 203. The baseband signal that is output from the baseband signal processing section 204 is converted into a radio frequency bandwidth in the transmitting/receiving sections 203. The radio frequency signals that are subjected to frequency conversion in the transmitting/receiving sections 203 are amplified in the amplifying sections 202, and transmitted from the transmitting/receiving antennas 201.

Figure 12:
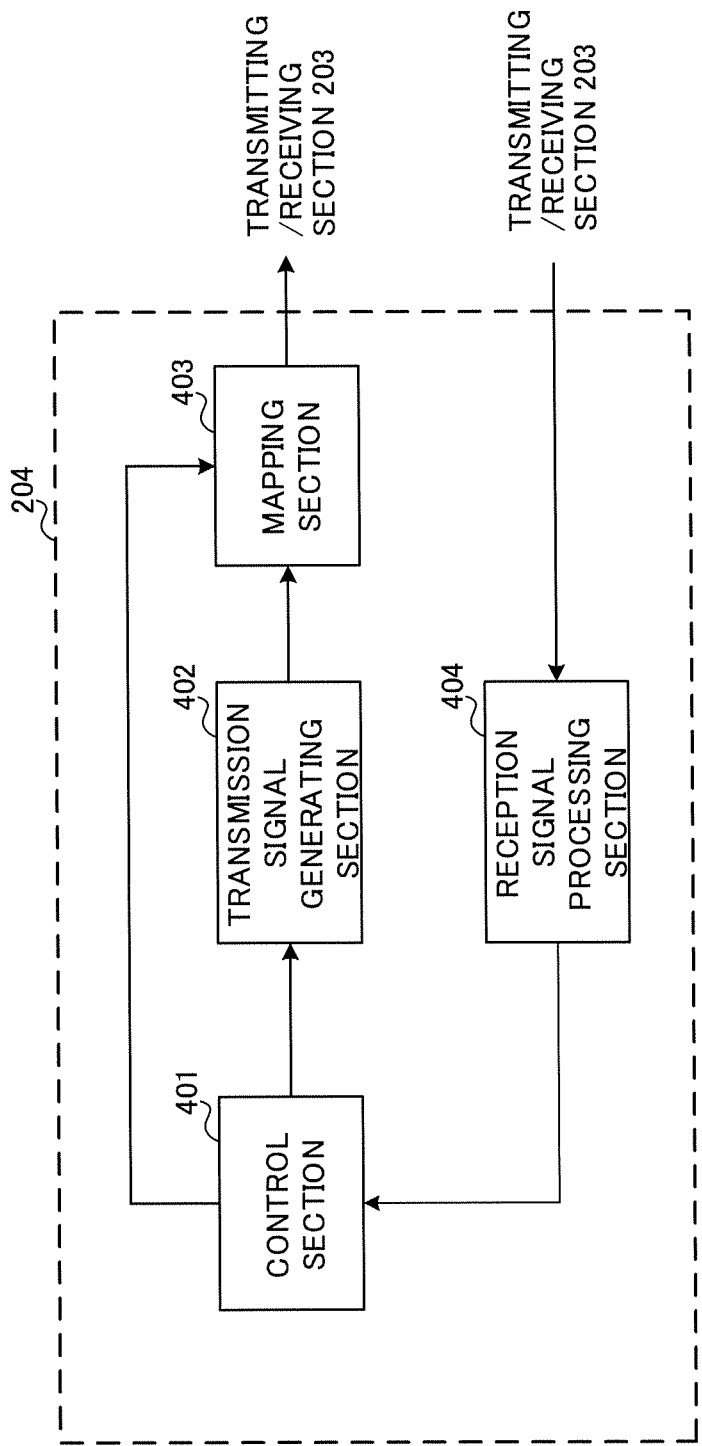
FIG. 12 is a diagram to show an example of a functional structure of a user terminal according to the present embodiment.

FIG. 12 is a diagram to show an example of a functional structure of a user terminal according to the present embodiment. Note that, although FIG. 12 primarily shows functional blocks that pertain to characteristic parts of the present embodiment, the user terminal 20 has other functional blocks that are necessary for radio communication as well. As shown in FIG. 12, the baseband signal processing section 204 provided in the user terminal 20 has a control section 401, a transmission signal generating section 402, a mapping section 403 and a received signal processing section 404.

The control section 401 acquires the downlink control signals (signals transmitted in the PDCCH/EPDCCH) and downlink data signals (signals transmitted in the PDSCH) transmitted from the radio base station 10, from the received signal processing section 404. The control section 401 controls the generation of uplink control signals (for example, delivery acknowledgement signals (HARQ-ACKs) and so on) and uplink data signals based on the downlink control signals, the results of deciding whether or not re transmission control is necessary for the downlink data signals, and so on. To be more specific, the control section 401 can control the transmission signal generating section 402, the mapping section 403 and the received signal processing section 404.

When employing cross-carrier scheduling, the control section 401 can control a PDSCH receiving process in a predetermined CC based on the received CIF, and give an instruction to the received signal processing section 404. Also, the control section 401 may control a PUSCH transmission process of a predetermined CC based on the received CIF. Also, the control section 401 can determine a predetermined CC considering an offset configured to the CIF value of each CC that transmits downlink control information including the CIF (first embodiment). To be more specific, the control section 401 can add a different offset to the CIF value transmitted from each scheduling CC and determine the predetermined CC.

Also, the control section 401 can determine a predetermined CC based on a table that defines information about a CC corresponding to the CIF of each CC that transmits downlink control information including the CIF (second embodiment).

For the control section 401, a controller, a control circuit or a control device that can be described based on common understanding of the technical field to which the present invention pertains can be used.

The transmission signal generating section 402 generates UL signals based on commands from the control section 401, and outputs these signals to the mapping section 403. For example, the transmission signal generating section 402 generates uplink control signals such as delivery acknowledgement signals (HARQ-ACKs), channel state information (CSI) and so on, based on commands from the control section 401.

Also, the transmission signal generating section 402 generates uplink data signals based on commands from the control section 401. For example, when a UL grant is included in a downlink control signal that is reported from the radio base station 10, the control section 401 commands the transmission signal generating section 402 to generate an uplink data signal. For the transmission signal generating section 402, a signal generator, a signal generating circuit or a signal generating device that can be described based on common understanding of the technical field to which the present invention pertains can be used.

The mapping section 403 maps the uplink signals (uplink control signals and/or uplink data) generated in the transmission signal generating section 402 to radio resources based on commands from the control section 401, and output the result to the transmitting/receiving sections 203. For the mapping section 403, mapper, a mapping circuit or a mapping device that can be described based on common understanding of the technical field to which the present invention pertains can be used.

The received signal processing section 404 performs receiving processes (for example, demapping, demodulation, decoding and so on) of DL signals (for example, downlink control signals transmitted from the radio base station, downlink data signals transmitted in the PDSCH, and so on). The received signal processing section 404 outputs the information received from the radio base station 10, to the control section 401. The received signal processing section 404 outputs, for example, broadcast information, system information, RRC signaling, DCI and so on, to the control section 401.

Also, when employing cross-carrier scheduling, the received signal processing section 404 can determine a predetermined CC corresponding to the CIF included in downlink control information based on the command from the control section 401 and receive a PDSCH of the predetermined CC. The received signal processing section 404 can be constituted by a signal processor, a signal processing circuit or a signal processing device, and a measurer, a measurement circuit or a measurement device that can be described based on common understanding of the technical field to which the present invention pertains. Also, the received signal processing section 404 can constitute the receiving section according to the present invention.

Note that the block diagrams that have been used to describe the above embodiments show blocks in functional units. These functional blocks (components) may be implemented in arbitrary combinations of hardware and software. Also, the means for implementing each functional block is not particularly limited. That is, each functional block may be implemented with one physically-integrated device, or may be implemented by connecting two physically-separate devices via radio or wire and using these multiple devices.

For example, part or all of the functions of radio base stations 10 and user terminals 20 may be implemented using hardware such as an ASIC (Application-Specific Integrated Circuit), a PLD (Programmable Logic Device), an FPGA (Field Programmable Gate Array), and so on. Also, the radio base stations 10 and user terminals 20 may be implemented with a computer device that includes a processor (CPU), a communication interface for connecting with networks, a memory and a computer-readable storage medium that holds programs.

Here, the processor and the memory are connected with a bus for communicating information. Also, the computer-readable recording medium is a storage medium such as, for example, a flexible disk, an opto-magnetic disk, a ROM, an EPROM, a CD-ROM, a RAM, a hard disk and so on. Also, the programs may be transmitted from the network through, for example, electric communication channels. Also, the radio base stations 10 and user terminals 20 may include input devices such as input keys and output devices such as displays.

The functional structures of the radio base stations 10 and user terminals 20 may be implemented with the above-described hardware, may be implemented with software modules that are executed on the processor, or may be implemented with combinations of both. The processor controls the whole of the user terminals by running an operating system. Also, the processor reads programs, software modules and data from the storage medium into the memory, and executes various types of processes. Here, these programs have only to be programs that make a computer execute each operation that has been described with the above embodiments. For example, the control section 401 of the user terminals 20 may be stored in the memory and implemented by a control program that operates on the processor, and other functional blocks may be implemented likewise.

Now, although the present invention has been described in detail above, it should be obvious to a person skilled in the art that the present invention is by no means limited to the embodiments described herein. For example, the above-described embodiments may be used individually or in combinations. The present invention can be implemented with various corrections and in various modifications, without departing from the spirit and scope of the present invention defined by the recitations of claims. Consequently, the description herein is provided only for the purpose of explaining example s, and should by no means be construed to limit the present invention in any way.

The disclosure of Japanese Patent Application No. 2015-015432, filed on Jan. 29, 2015, including the specification, drawings and abstract, is incorporated herein by reference in its entirety.

The invention claimed is:

1. A terminal that is capable of communicating with a plurality of scheduling cells that perform scheduling and with a plurality of scheduled cells each of which is scheduled on any one of the scheduling cells, the terminal comprising:
   a receiver that receives downlink control information; and
   a processor that controls cross-carrier scheduling and at least one of a receiving process of a downlink shared channel (PDSCH) and a transmission process of an uplink shared channel (PUSCH),
   wherein the terminal is provided, by higher layer signaling, with cross-carrier scheduling information for the plurality of scheduled cells, each cross-carrier scheduling information indicating correspondence between:
  one scheduled cell among the plurality of scheduled cells that is scheduled by the downlink control information on one scheduling cell among the plurality of scheduling cells,
  a scheduling cell index that is a cell index of the one scheduling cell, and
  a Carrier Indicator Field (CIF) value corresponding to the one scheduled cell, and
wherein, when the downlink control information including the CIF value is received on the one scheduling cell and a combination of the CIF value included in the downlink control information and the scheduling cell index of the one scheduling cell that has received the downlink control information is associated with the one scheduled cell in the cross-carder scheduling information, the processor controls at least one of the receiving process of the PDSCH and the transmission process of the PUSCH on the one scheduled cell in accordance with the downlink control information.

2. A radio base station that communicates with a terminal using a plurality of scheduling cells that perform scheduling and a plurality of scheduled cells each of which is scheduled on any one of the scheduling cells, the radio base station comprising:
  a transmitter that transmits downlink control information; and
  a processor that controls cross-carrier scheduling and higher layer signaling,
  wherein the terminal is provided, by the higher layer signaling, with cross-carrier scheduling information for the plurality of scheduled cells, each cross-carrier scheduling information indicating correspondence between:
    one scheduled cell among the plurality of scheduled cells that is scheduled by the downlink control information on one scheduling cell among the plurality of scheduling cells,
    a scheduling cell index that is a cell index of the one scheduling cell, and
    a Carrier Indicator Field (CIF) value corresponding to the one scheduled cell, and
  wherein when the terminal performs cross-carrier scheduling to control at least one of a receiving process of a downlink shared channel (PDSCH) and a transmission process of an uplink shared channel (PUSCH) on the one scheduled cell by using the downlink control information received from the one scheduling cell, the processor controls to transmit, via the one scheduling cell, the downlink control information including the CIF value corresponding to the one scheduled cell in the cross-carrier scheduling information.

3. A radio communication method for a terminal using a plurality of scheduling cells that perform scheduling and a plurality of scheduled cells each of which is scheduled on any one of the scheduling cells, the radio communication method comprising:
  receiving downlink control information;
  controlling cross-carrier scheduling and at least one of a receiving process of a downlink shared channel (PDSCH) and a transmission process of an uplink shared channel (PUSCH), and
  providing the terminal, by higher layer signaling, with cross-carrier scheduling information for the plurality of scheduled cells, each cross-carrier scheduling information indicating correspondence between:
    one scheduled cell among the plurality of scheduled cells that is scheduled by the downlink control information on one scheduling cell among the plurality of scheduling cells,
    a scheduling cell index that is a cell index of the one scheduling cell, and
    a Carrier Indicator Field (CIF) value corresponding to the one scheduled cell,
  wherein, when the downlink control information including the CIF value is received on the one scheduling cell and a combination of the CIF value included in the downlink control information and the scheduling cell index of the one scheduling cell that has received the downlink control information is associated with the one scheduled cell in the cross-carrier scheduling information, the terminal controls at least one of the receiving process of the PDSCH and the transmission process of the PUSCH on the one scheduled cell in accordance with the downlink control information.

* * * * *